(No Model.) 2 Sheets—Sheet 1.

P. PFLEIDERER & H. WERNER.
BAKING OVEN.

No. 505,175. Patented Sept. 19, 1893.

Witnesses:
J. A. Rutherford
Robert Everett

Inventors:
Paul Pfleiderer and
Hermann Werner
By James L. Norris
Attorney (No Model.) 2 Sheets—Sheet 2.

P. PFLEIDERER & H. WERNER.
BAKING OVEN.

No. 505,175. Patented Sept. 19, 1893.

UNITED STATES PATENT OFFICE.

PAUL PFLEIDERER, OF LONDON, ENGLAND, AND HERMANN WERNER, OF CANNSTADT, GERMANY.

BAKING-OVEN.

SPECIFICATION forming part of Letters Patent No. 505,175, dated September 19, 1893.

Application filed September 29, 1891. Serial No. 407,193. (No model.)

*To all whom it may concern:*

Be it known that we, PAUL PFLEIDERER, of London, in the county of Middlesex, England, and HERMANN WERNER, of Cannstadt, near Stuttgart, in the Kingdom of Würtemberg and German Empire, have invented a certain new and useful Improvement in Baking-Ovens, of which the following is a specification.

Our invention relates to bakers' ovens and has for its object to provide for such ovens a baking plate or surface upon which the material to be baked may be placed and, after baking, removed, without withdrawing such plate or surface from the oven, and which may be easily operated from the outside of the oven.

To these ends our invention consists in the novel construction and combination of parts hereinafter described and claimed, reference being made to the accompanying drawings, in which—

Figure 1:
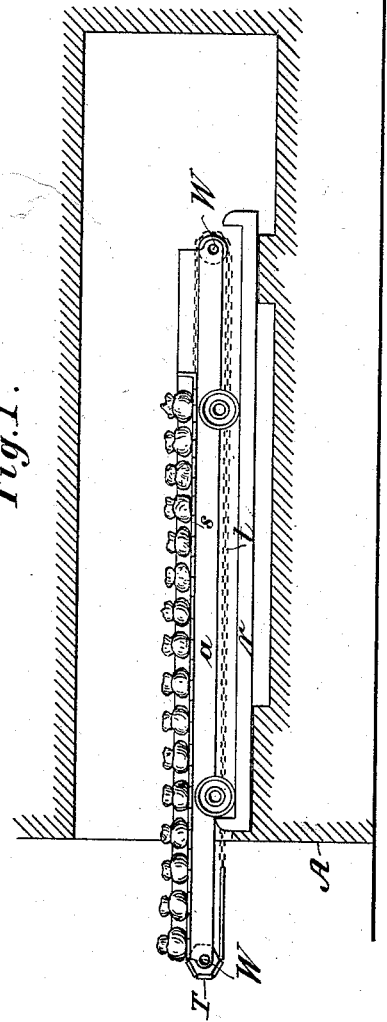
Figure 2:
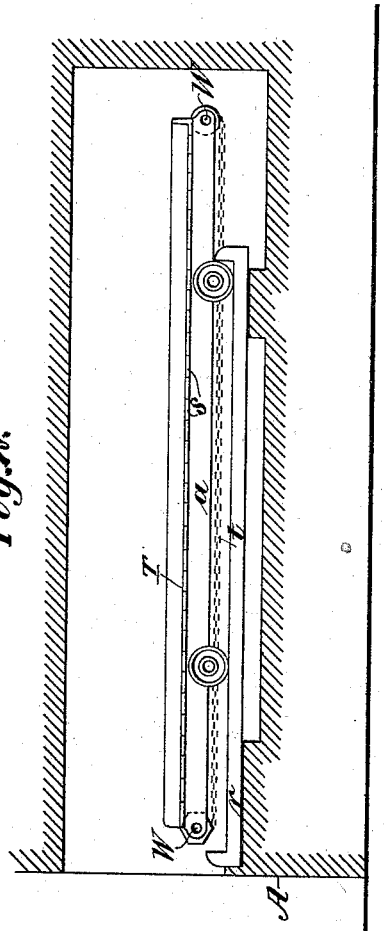
Figure 3:
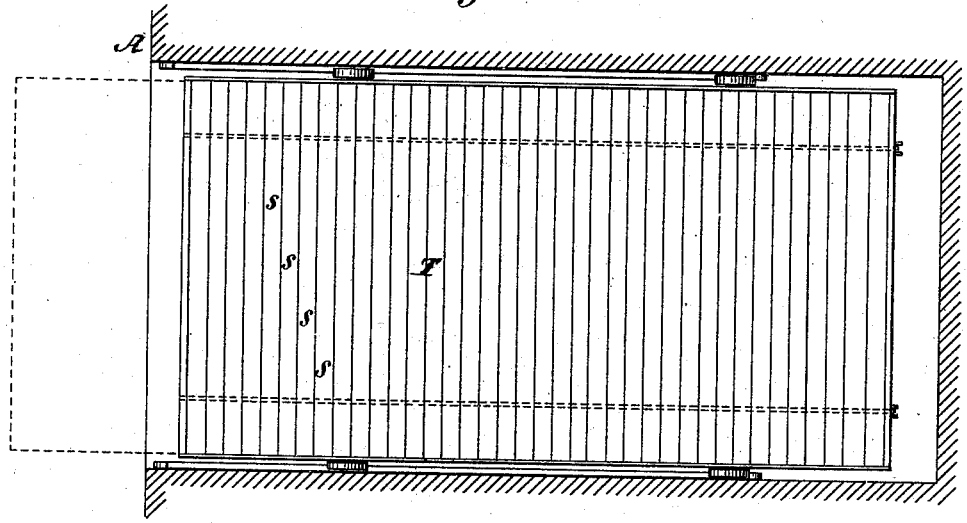
Figure 4:
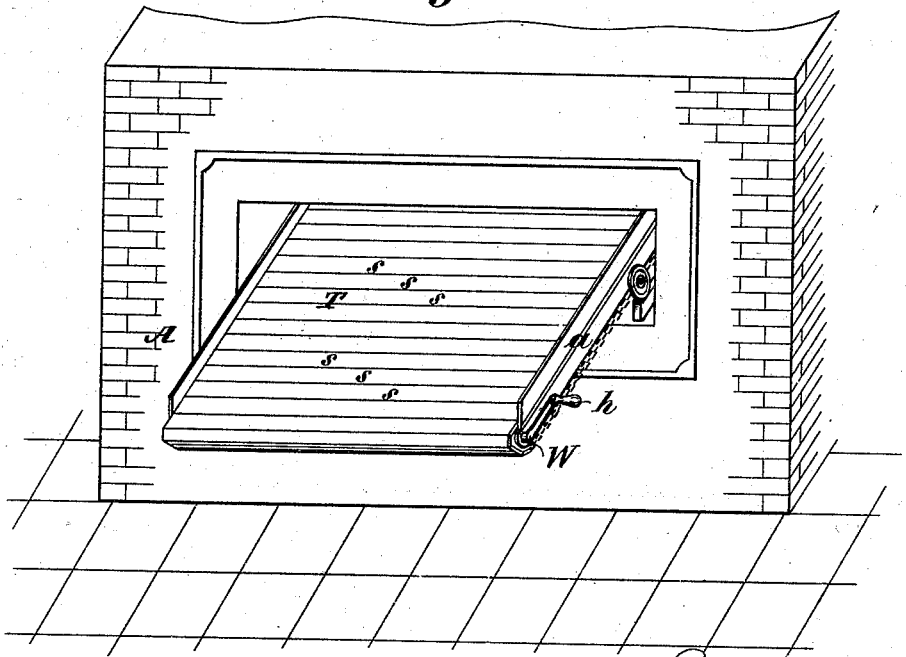

Figure 1, is a vertical sectional view of an oven showing our improved baking plate or surface in side elevation, and partly withdrawn from the oven. Fig. 2 is a similar view showing said plate wholly within the oven. Fig. 3 is a horizontal sectional view of the baking oven, the baking plate being in plan. Fig. 4 is a perspective view showing the baking plate partly withdrawn from the oven.

In the said drawings the reference letter A, designates an oven which, otherwise than hereinafter described, may be of any usual or ordinary construction. Suitably secured to the interior bottom portion of said oven is a trackway $r$.

The letter $a$ represents a truck or carriage which is provided with wheels adapted to travel on the trackway $r$. Drums W are suitably supported at the front and rear ends of the truck or carriage $a$. Carried by the truck or carriage $a$ and trained around the drums W, is a flexible plate T composed of strips $s$, $s$, of suitable material. A crank handle $h$ is attached to the front drum W for manipulating the flexible plate or surface T. The plate T is made endless by connecting its ends by a chain, $t$, as illustrated in the drawings, or the said plate may be constructed of an endless series of strips $s$.

The manner of operating our invention will be obvious from the foregoing description and accompanying drawings. It is also obvious that two or any suitable number of plates carrying trucks may be employed.

By our invention we provide a novel and simple baking plate or surface, which may be operated with great facility and which is highly advantageous where economy of room is desirable, as well as in other obvious respects.

Having thus described our invention, what we claim is—

In a baker's oven the combination of rails suitably secured in the oven, a truck or carriage having wheels traveling on said rails, drums mounted in said carriage, and a flexible endless baking plate or surface mounted upon said rollers or drums, substantially as described.

In testimony whereof we have signed our names to this specification in the presence of subscribing witnesses.

PAUL PFLEIDERER.
HERMANN WERNER.

Witnesses as to signature of Paul Pfleiderer:
   HENRY CARNELLEY,
   WALTER SANDOVER.

Witnesses as to signature of Hermann Werner:
   CARL STIEGLER,
   ERNST SCHLENCK.